Oct. 14, 1958     A. R. COOPER ET AL     2,855,742
LAWN TRIMMER AND EDGER CONSTRUCTION
Filed April 18, 1955     3 Sheets-Sheet 1
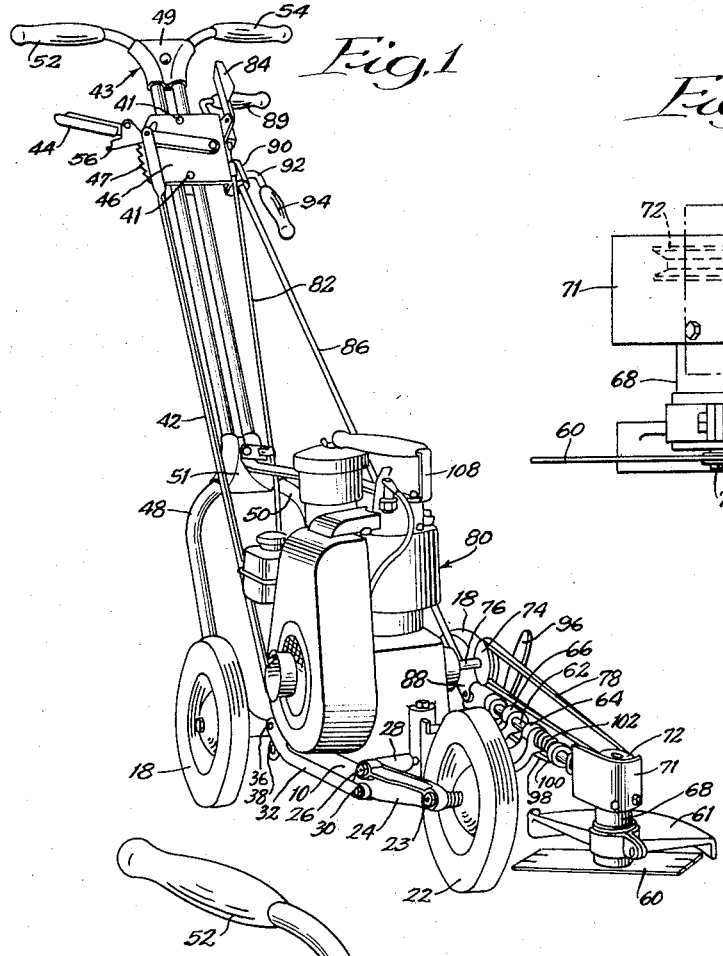

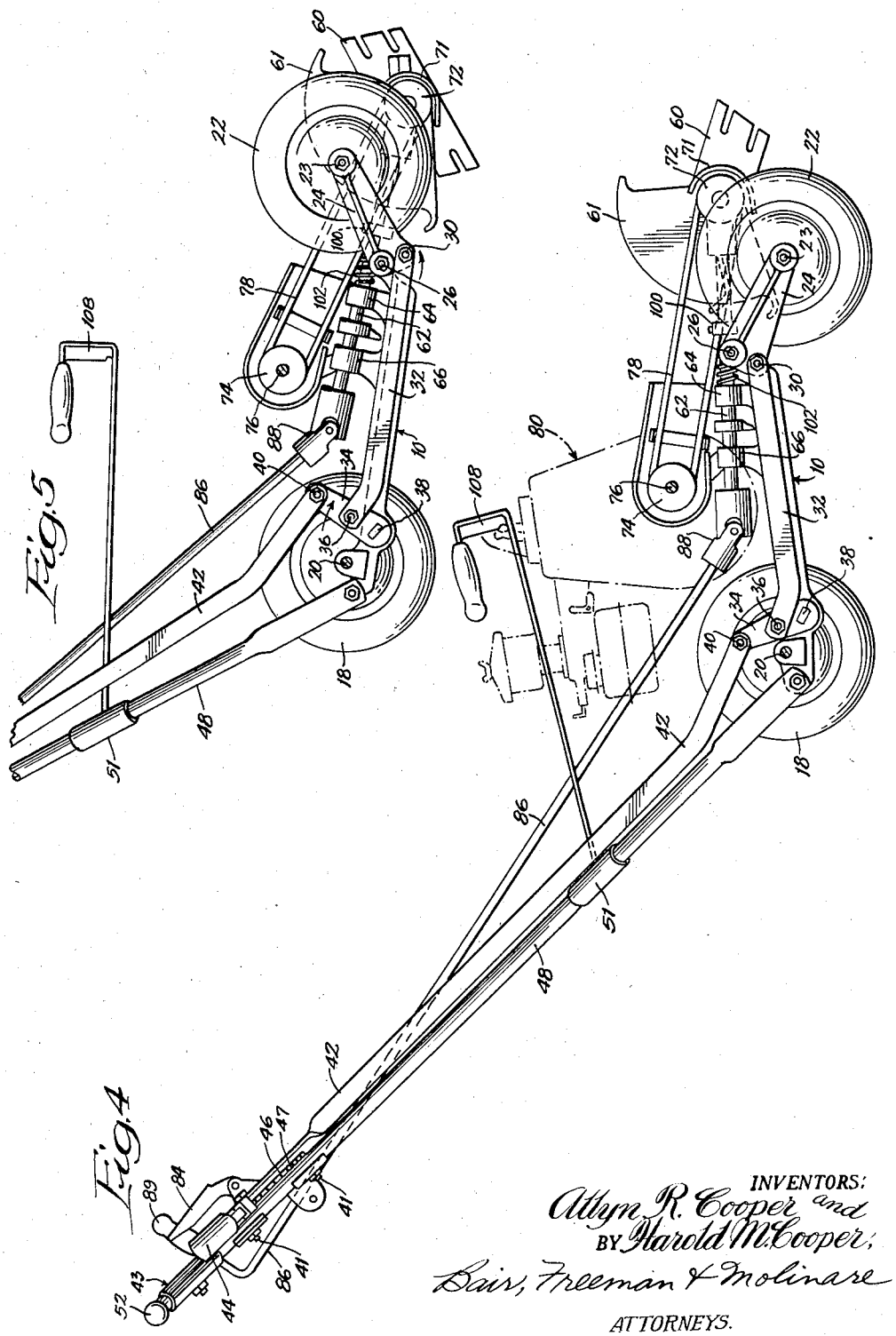

Oct. 14, 1958 A. R. COOPER ET AL 2,855,742
LAWN TRIMMER AND EDGER CONSTRUCTION
Filed April 18, 1955 3 Sheets-Sheet 3
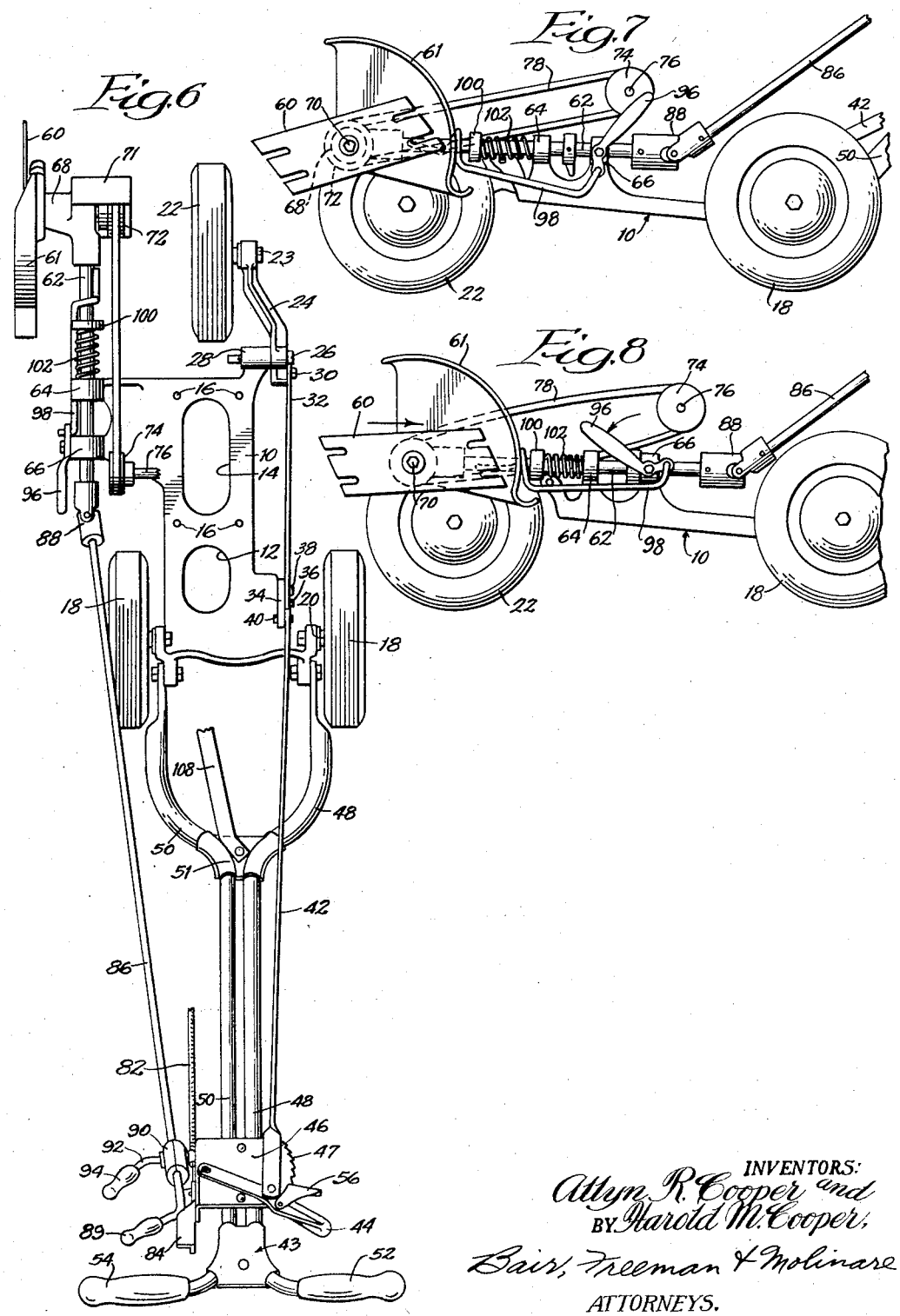

United States Patent Office 2,855,742
Patented Oct. 14, 1958

2,855,742

LAWN TRIMMER AND EDGER CONSTRUCTION

Allyn R. Cooper and Harold M. Cooper, Marshalltown, Iowa

Application April 18, 1955, Serial No. 502,050

1 Claim. (Cl. 56—25.4)

This invention relates to a power lawn trimming and edging machine. One object of the invention is to provide a wheeled implement of this type having a handle for guiding and pushing the machine which carries the controls for its operation clustered within convenient reach of the operator. Such controls include means for raising and lowering the cutting blade, means for adjusting the angle of the cutting blade with respect to the ground and means for controlling the speed of the cutting blade.

Another object is to provide a sturdy, well balanced power trimmer and edger which is light in weight and easy to operate.

Another object is to provide an implement of this kind having a frame supported by two rear wheels and a single vertically adjustable front wheel, with a cutting blade extending forwardly of the frame beside the front wheel.

These and other objects will become apparent from the following description when read in conjunction with the accompanying drawings, in which:

Figure 1 is a perspective view of the trimming and edging machine constructed in accordance with the invention;

Figure 2 is an enlarged end view of the cutting blade and bearing therefor looking from the front of the machine with the blade shown in vertical position by broken lines;

Figure 3 is an enlarged perspective view of the upper portion of the handle of the machine showing the controls mounted thereon;

Figure 4 is an enlarged side elevational view of the implement showing the cutting blade as an edger in elevated position, the engine being shown in broken lines;

Figure 5 is a fragmentary view similar to Figure 4 showing the cutting blade as an edger in lowered, ground engaging position;

Figure 6 is an enlarged plan view of the machine without the engine; and

Figures 7 and 8 are enlarged fragmentary side elevations showing the cutting blade assembly and the belt tightening clutch for engaging and disengaging the cutting blade with the power source. In Figure 7 the belt is taut and adapted to drive the cutting blade. In Figure 8 the belt is loose, thus disengaging the blade from the power source.

The cutting blade and the power source are carried by a frame or bed 10, best shown in Figure 6, containing large lightening holes 12 and 14 and four openings 16 for the engine mounting bolts. The frame may be made from any suitable material, but is preferably cast from an aluminum alloy which provides high strength combined with light weight. The frame is supported by three wheels, two wheels 18 being mounted on shafts or axles 20 extending laterally from the frame near the rear end thereof. A single front wheel 22 is mounted on an axle 23 fixed to the outer or free end of a cantilever arm 24 having its inner end pivotally mounted on shaft 26 journalled in bearing 28 comprising part of the frame casting. The bearing 28 extends laterally from the right side of the frame as viewed in Figure 6.

For pushing and guiding the implement a handle, indicated generally by the numeral 43, is secured to the rear of the frame. The handle consists of a pair of parallel tubular members 48 and 50 which are clamped in spaced relation by connector webs 49 and 51. Tubular members 48 and 50 spread out below connector 51 to form a U equal in width to the rear of the frame. The free ends of the U are pivotally bolted to the frame. The upper ends of the tubular members 48, 50 extend laterally in opposite directions to provide hand gripping portion 52, 54 which may have conventional rubber or plastic grips.

As best shown in Figures 4 and 5, the cantilever arm 24, which carries front wheel 22, is adjustable about the shaft 26 to move the wheel up or down with respect to the frame 10. The inner end of the arm 24 is sufficiently wide to journal a pin 30 directly below the shaft 26, which pin pivotally supports one end of the link 32, the other end of which connects to a boss 36 on lever 34. Lever 34 is pivotally secured at its lower end to the side of the frame behind the right rear wheel by means of a pin 38. The upper end of lever 34 is pivotally connected by means of a bolt 40 to the elevational control lever 42. The upper end of the control lever 42 is pivotally secured to the handle 44 at the midpoint thereof, which handle is pivotally mounted on the control panel 46, as best shown in Figure 3. The control panel is fixed by means of bolts 41 to the upper end of the handle 43, just below the hand gripping portions. Mounting panel 46 has a ratch 47 along one edge thereof which cooperates with a spring biased pawl 56 to form a ratchet device to permit locking the front wheel 22 at any desired position of elevation. The ratchet permits moving the handle 44 upwardly by applying force in that direction since the pawl 56 slides over the teeth when moving in the upward direction. The ratchet prevents the control rod 42 from moving downwardly except upon compressing the pawl against the handle to remove it from the teeth of the ratch. Thus, the elevation of the frame (and the cutting blade carried thereon) may be conveniently adjusted through the linkage described by moving the handle 44.

The cutting blade 60 is rotatably mounted on the end of shaft 62 which is journalled in a pair of longitudinally-spaced bearings 64, 66 comprising an integral part of the frame casting and extending laterally therefrom on the left side of the frame (see Figure 6). A bearing 68 fixed to the end of shaft 62 and at right angles to the axis thereof has a shaft 70 extending therethrough. The cutting blade 60 is fixed to the outer end of the shaft 70 and a pulley 72 is fixed to the opposite end on the inner side of the bearing. An engine 80 is bolted to the center of the frame, the drive shaft of which carries pulley 74. A V-belt 78 is trained about pulleys 72, 74 to connect the blade 60 to the engine. Although an internal combustion engine has been shown as the power source in the form of the invention illustrated, it will be understood that the apparatus can be powered by an electric motor or other suitable power means. A flexible cable 82 extends from the carburetor of the engine to the control panel 46 on the handle to facilitate throttling the engine by means of the hand throttle 84.

The blade 60, shown in the drawing, is of parallelogram shape and contains axial notches in the ends thereof to form individual projections, Figures 4 and 5. The shape of the blade, however, is not critical and any suitable blade may be employed. It is not necessary that the blade have a sharp cutting edge since it rotates at a very high rate of speed and is capable of shearing off vegetation, or digging into the ground when the device is used as an edger, to provide clean, accurate cuts.

Suitable guards 61 and 71 are fixed to the bearing 68 to protect anything or anyone near the machine from being caught in the blade 61 or the V-belt 78. The blade guard 61 must necessarily be limited in circumferential extent to the top and rear sides of the blade (when the blade is in vertical position) so that there is no interference with the functioning thereof in either edging or trimming positions.

Referring again to Figure 6, the shaft 62 on which the blade 60 is mounted connects at its rear end to a rotational control rod 86 by means of a suitable universal joint 88. The upper end of the control rod 86 is journalled in a split collar 90 fixed to the control panel 46 to permit locking the rod against rotation. The inner half of the collar 90 is suitably secured to the side of the control panel 46. The outer half of the collar may be drawn toward the inner half to compress the rod 86 therebetween by means of a screw 92 which extends through an opening in the outer half of the collar and threadedly engages the inner half. The screw terminates in an angular handle 94 and has a nut 91 that bears against the outer half of collar 90. It will be noted that the rod 86 also terminates in an angular or bent portion 89 having a grip thereon for the purpose of manually rotating the rod 86.

As best shown in Figures 7 and 8, the shaft 62 will slide axially in its bearings to decrease the distance between the pulleys 72 and 74, thus disengaging the belt 78. The means provided for accomplishing this clutching arrangement consists of a handle or lever 96 which is pivotally mounted on the end of the rear bearing 66. The lower end of the lever 96 pivotally connects to one end of a rod 98. The other end of the rod 98 loops over the shaft 62 adjacent to collar 100 which is fixed to the shaft by means of a set screw or the like. The rod is shaped so as to clear the bearings 64, 66. Between the collar 100 and the bearing 64 a coil spring 102 is provided embracing the shaft 62. The spring normally urges the shaft 62 forward to move pulley 72 outwardly and keep the belt 78 taut. When the lever 96 is thrown forward, as shown in Figure 8, the rod 98 moves the shaft rearwardly to compress the spring 102 between the collar 100 and the bearing 64.

For conveniently picking up the machine we have provided a carrying arm 108 which is fixed to the engine and extends rearwardly to the handle 43 connecting thereto at the connector 51. The grip of the carrying arm 108 is directly over the center of gravity so that the machine may be picked up by one hand.

The operation of the apparatus will be apparent from the foregoing description. It will appear that the implement may be very simply and conveniently controlled by an operator standing at the rear of the machine adjacent to the handle 43 on which all of the controls are mounted. If it is desired to use the apparatus as a trimmer, the rotational control rod 86 is turned by means of the convenient handle 89 to rotate the shaft 62 and the blade 60 mounted thereon to horizontal or trimming position, as shown in Figure 1. The rod 86 is then locked against rotation by turning the handle of the screw 92 to tighten the collar 90 against the rod. The elevation of the blade 60 above the ground may be conveniently adjusted by moving the elevational control lever 42 by means of the handle 44. To lower the cutting blade, the ratchet pawl 56 is disengaged from the teeth of the ratch and the lever 42 is lowered, as for example, from the position of Figure 4 to the position of Figure 5. It will be noted that as the lever 42 is lowered, the link 32 moves forwardly, thus raising the wheel 22 with respect to the frame and lowering the blade, which, of course, is secured to and moves with the frame. By means of the ratchet arrangement the height of the blade may be accurately adjusted at any desired position.

When it is desired to use the implement as an edger, the handle 44 is pulled upwardly to raise the cutting blade 60 to maximum height and the rotary control rod 86 is then turned, after loosening the screw 92, to place the cutting blade in vertical position, as illustrated in Figures 4 and 5. The cutting blade is then lowered by means of the handle 44 so that it cuts to the desired depth. The speed of the cutting blade may be conveniently adjusted by means of the throttle 84, which controls the speed of engine 80. Thus, it will be seen that the apparatus may be operated entirely from the standing position except for the engaging or disengaging of the belt tightening clutch. This adjustment is made generally only when the machine is first put into operation and after operation has been discontinued.

Another important advantage provided by the structure of the present invention is good balance. The operator does not have to exert force on the handle to keep the implement level, even when the cutting blade is digging into the ground as an edger, which tends to lower the front end. This balance is provided by mounting the cutting blade beside the adjustable wheel 22 and the engine rearwardly on the frame. Thus, most of the weight of the engine is carried by the rear wheels 18, while the front wheel 22 counteracts the downward forces that would tend to lower the front end. By keeping the implement balanced in this way the distance of the cutting blade above (or below) the ground is accurately maintained with no effort on the part of the operator.

Although the invention has been illustrated in a single form, it will be understood that changes in the details of construction may be made within the scope of the appended claims, without departing from the spirit of the invention.

We claim:

In a power lawn trimming and edging machine, a frame having an engine-supporting deck supported by two rear wheels and a single vertically adjustable front wheel mounted on a pivotable cantilever arm extending forwardly of the frame, said cantilever arm being pivoted from a bearing integral with the frame and extending forwardly therefrom at one side thereof above the plane of said deck, a blade-carrying arm rotatably mounted in bearings integral with the frame and extending laterally therefrom at the opposite side thereof above the plane of said deck, a cutting blade rotatably mounted on the forward end of the arm beside the front wheel with its axis at right angles to the axis of the arm, a handle extending upwardly from the rear of the frame for pushing and guiding the machine, a control panel fixed to said handle within convenient reach of the operator, an engine mounted on said deck, a throttle for the engine mounted on the control panel, belt means coupling the engine to the cutting blade, a clutch comprising means moving said blade-carrying arm axially within the bearings to tighten or loosen said belt means, a control rod having its upper end secured to said control panel and its lower end fixed to the rearward end of the blade-carrying arm by means of a universal joint, said rod being adapted to rotate said arm for adjusting the angle of the cutting blade with respect to the ground, locking means comprising a vise fixed to the control panel for securing said rod against rotation, a blade elevation control lever having its upper end fixed to a second handle pivotally mounted on the control panel and its lower end connected through a link to the cantilever arm for adjusting the height of the front wheel to regulate the distance between the blade and the ground, and ratchet means cooperating with said second handle to fix the lever at the desired position and prevent change in elevation of the blade during operation.

References Cited in the file of this patent

UNITED STATES PATENTS

| | | |
|---|---|---|
| 878,867 | Coldwell | Feb. 11, 1908 |
| 2,546,265 | Kelsey | Mar. 27, 1951 |
| 2,680,945 | Reed | June 15, 1954 |
| 2,690,636 | Besse et al. | Oct. 5, 1954 |
| 2,691,264 | Miller | Oct. 12, 1954 |
| 2,721,433 | Berdan | Oct. 25, 1955 |
| 2,724,230 | Burmeister | Nov. 22, 1955 |
| 2,739,437 | True | Mar. 27, 1956 |